US005988872A

United States Patent [19]

Jeong

[11] Patent Number: 5,988,872

[45] Date of Patent: Nov. 23, 1999

[54] SECTOR DATA DECODING METHOD AND CIRCUIT IN A CD-ROM DRIVE

[75] Inventor: Seong-Hyun Jeong, Ahnsan, Rep. of Korea

[73] Assignee: Samsung Electronics Co., Ltd., Kyungki-do, Rep. of Korea

[21] Appl. No.: 08/791,145

[22] Filed: Jan. 30, 1997

[30] Foreign Application Priority Data

Jun. 10, 1996 [KR] Rep. of Korea .................... 96-20634

[51] Int. Cl.[6] .............................................. G11C 29/00

[52] U.S. Cl. ................................. 371/40.14; 371/37.4

[58] Field of Search ........................... 371/37.01, 37.4, 371/40.11, 40.2, 40.4, 40.14, 40.16, 40.17

[56] References Cited

U.S. PATENT DOCUMENTS 4,802,152 1/1989 Markvoort et al. .

4,802,173 1/1989 Baggen ................................ 371/37.1

5,347,640 9/1994 You .

5,412,667 5/1995 Havemose ............................ 371/37.5

5,661,848 8/1997 Bonke et al. ......................... 395/439

5,793,779 8/1998 Yonemitsu et al. .................. 371/40.2

*Primary Examiner*—Emmanuel L. Moise

*Attorney, Agent, or Firm*—Sughrue, Mion, Zinn, Macpeak & Seas, PLLC

[57] ABSTRACT

A sector data decoding circuit of a CD-ROM drive including an external memory has an input data processing unit which rearranges data received from a frame decoder of the CD-ROM drive into a CD-ROM sector data format. The rearranged data is stored in the external memory, Q and P signals are generated as is an error correcting interval signal. An L-plane error correcting unit and an R-plane error correcting unit are provided for respectively performing error correction on the L-plane and R-plane data within the one sector data stored in the external memory. A host data transmitting unit transmits the data stored in the external memory after being error corrected, to a host computer. Thus, the error correcting process separately performs error correction in parallel to shorten a period of receiving the data, thereby affording much more time in transmitting the data.

16 Claims, 4 Drawing Sheets

QL = Q CODE WORD LEFT PLANE

PL = P CODE WORD LEFT PLANE

QR = Q CODE WORD RIGHT PLANE

PP = P CODE WORD RIGHT PLANE

|  | 0 | 1 | 2 | 3 | 4 | ---- ---- ---- ---- | 40 | 41 | 42 |  |
|---|---|---|---|---|---|---|---|---|---|---|
| 0 | 0000 | 0001 | 0002 | 0003 | 0004 | ---- ---- ---- ---- | 0040 | 0041 | 0042 | HEADER USER DATA EDC/ZERO |
| 1 | 0043 | 0044 | 0045 | 0046 | 0047 | ---- ---- ---- ---- | 0083 | 0084 | 0085 |  |
| 2 | 0086 | 0087 | 0088 | 0089 | 0090 | ---- ---- ---- ---- | 0126 | 0127 | 0128 |  |
| 3 | 0129 | 0130 | 0131 | 0132 | 0133 | ---- ---- ---- ---- | 0169 | 0170 | 0171 |  |
| 4 | 0172 | 0173 | 0174 | 0175 | 0176 | ---- ---- ---- ---- | 0212 | 0213 | 0214 | HEADER SUB HEADER USER DATA EDC |
|  | P sequence |  |  |  |  | Q sequence |  |  |  |  |
| 22 | 0946 | 0947 | 0948 | 0949 | 0950 | ---- ---- ---- ---- | 0986 | 0987 | 0989 |  |
| 23 | 0989 | 0990 | 0991 | 0992 | 0993 | ---- ---- ---- ---- | 1029 | 1030 | 1031 |  |
| 24 | 1032 | 1033 | 1034 | 1035 | 1036 | ---- ---- ---- ---- | 1072 | 1073 | 1074 | P PARITY |
| 25 | 1075 | 1076 | 1077 | 1078 | 1079 | ---- ---- ---- ---- | 1115 | 1116 | 1117 |  |
| 26 | 1118 | 1119 | 1120 | 1121 | 1122 | ---- ---- 1143 |  |  |  | Q PARITY |
| 27 | 1144 | 1145 | 1146 | 1147 | 1148 | ---- ---- 1169 |  |  |  |  |
|  | 0 | 1 | 2 | 3 | 4 | ---- ---- 25 |  |  |  |  |

* P CODE WORD : (26, 24, 3) X 43
* Q CODE WORD : (45, 43, 3) X 26

Fig. 4

SECTOR DATA DECODING METHOD AND CIRCUIT IN A CD-ROM DRIVE

BACKGROUND OF THE INVENTION

1. Field of the Invention

The present invention relates to a sector data decoder in a CD-ROM drive. More particularly it relates to a sector data decoding method and circuit in a CD-ROM drive in which two error correction modules using error correction parity information located within sector data are provided for performing error correction in parallel. Using two error correction modules shortens the time required for decoding the sector data, thereby providing the capability to correspond with a high-speed host computer, which follows the current trend of attaining high-speed operation of a CD-ROM. The present application is based upon Korean Application No. 20634/1996, which is incorporated herein by reference.

2. Description of the Related Art

A decoding circuit according to a conventional technique is constructed as shown in FIG. 1. The decoding circuit of FIG. 1 includes an input data storing unit 101 for storing in an external memory 102 data input from a CD-DA unit of a preprocessing portion of a CD-ROM, an error correcting unit 103 for correcting an error in sector data, and a host data transmitting unit 104 for transmitting data to a host computer.

Referring to FIG. 1, generally, the error correction process begins after storing in external memory 102 one sector data of the input sector data. At this time, L-plane and R-plane data corresponding to the same offset are simultaneously read out from external memory 102, error correction is independently executed with respect to the data separated into the L-plane and R-plane, and the result is stored in external memory 102. FIG. 4 represents 1170 bytes of data which correspond to the L-plane, from among 2340 bytes which correspond to 2352 bytes of sector data less 12 bytes of SYNC data. The R-plane data has the same format as the L-plane data and accounts for the other 1170 bytes of non-SYNC sector data.

Here, the L and R-planes (L/R-planes) are processed by the same error correcting process which is carried out in such a manner that a Q code word correction operation is first executed prior to execution of a P code word correction operation. The P code word consists of a total of 43 code words, in which each of the code words consists of 26 bytes. Also, Q code words number 26 in total, and each of those code words consists of 45 bytes.

In the conventional error correcting process discussed above, as shown in FIG. 3, the 26 Q code words of the L-plane are subjected to correction prior to correction of the 43 P code words of the L-plane. Then, correction of the Q and P code words is carried out with respect to the R-plane. That is, correction of the Q and P code words is repeatedly performed with respect to the L/R-planes.

When performing such an error correcting process, all data is read out from external memory 102 and input to error correcting unit 103. Thereafter, the error value is calculated and the result is stored in external memory 102. However, this process involves frequent access of the external memory which has the effect of impeding operations other than error correction in using external memory 102. Besides, the operation of input data storing unit 101, error correcting unit 103 and host data transmitting unit 104 are independently executed with respect to data stored in external memory 102 in units of one sector data.

Generally, a digital data signal processing section of a CD-ROM system is largely divided into a plane decoder and a sector data decoder of the CD-DA unit. Here, data received from the plane decoder is rearranged in the form of sector data to be stored in external memory 102. When one sector data (of 2352 bytes) is completely stored by input data storing unit 101, error correction is performed by error correcting unit 103. At this time, one sector is divided into the L/R-planes, and the error correcting process is carried out twice to store the result in external memory 102 again. Upon finishing the error correcting process, the corrected data is transmitted to the host computer via host data transmitting unit 104, so that the operation of the sector data processing unit of the CD-ROM is completed.

The sector data format used is illustrated in FIG. 3, and the plane format of the sector data subjected to error correction is illustrated in FIG. 4.

However, error correction is performed by dividing one sector data stored in external memory 102 into two left and right L/R-planes, in which, after the error correction process for the first plane is completed, the second plane is subjected to error correction. The time taken for performing the foregoing two steps is being given much weight along with attaining the high speed trend in the CD-ROM system. Due to this fact, the error correcting pattern has significantly hindered heightening the processing speed when being changed into the high-speed system.

SUMMARY OF THE INVENTION

Therefore, it is an object of the present invention to provide a method and circuit for simultaneously performing error correction processes on sector data which is divided into two planes, via error correcting units for the two planes in order to decrease the time required for performing the error correction, thereby providing the capability for high-speed processing and improving the data transmission speed to a host computer.

To achieve the above object of the present invention, a sector data decoding method of a CD-ROM drive is provided which comprises performing an error correcting process on left (L) plane code-words of a sector data with an L-plane error correcting unit; and performing an error correcting process on right (R) plane code-words of the sector data with an R-plane error correcting unit, wherein the R-plane error correcting unit and the L-plane correcting unit are connected in parallel and perform the error correcting processes separately from each other and at the same time as each other.

Also, a sector data decoding circuit of a CD-ROM drive including an external memory, comprising an input data processing unit for rearranging data received from a frame decoder unit of the CD-ROM drive into a CD-ROM sector data format having code-words arranged in left (L) and right (R) planes, storing the rearranged data in the external memory, and generating a code-word control signal and an error correcting interval signal; an L-plane error correcting unit for performing error correction on the L-plane code-words within the one sector data stored in the external memory, and storing the L-plane error corrected data in the external memory; an R-plane error correcting unit for performing the error correction on the R-plane code-words within the one sector data stored in the external memory and storing the R-plane error corrected data in the external memory, wherein the L-plane and R-plane error correcting units perform the error correction at the same time; and a host data transmitting unit for transmitting to a host computer the data stored in the external memory after being error corrected by the L-plane and R-plane error correcting units.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 shows an error correction code (ECC) memory map (LP);

DETAILED DESCRIPTION OF THE PREFERRED EMBODIMENT

A preferred embodiment of a sector data decoding method and circuit according to the present invention is described below in detail with reference to the accompanying drawings.

Figure 5:
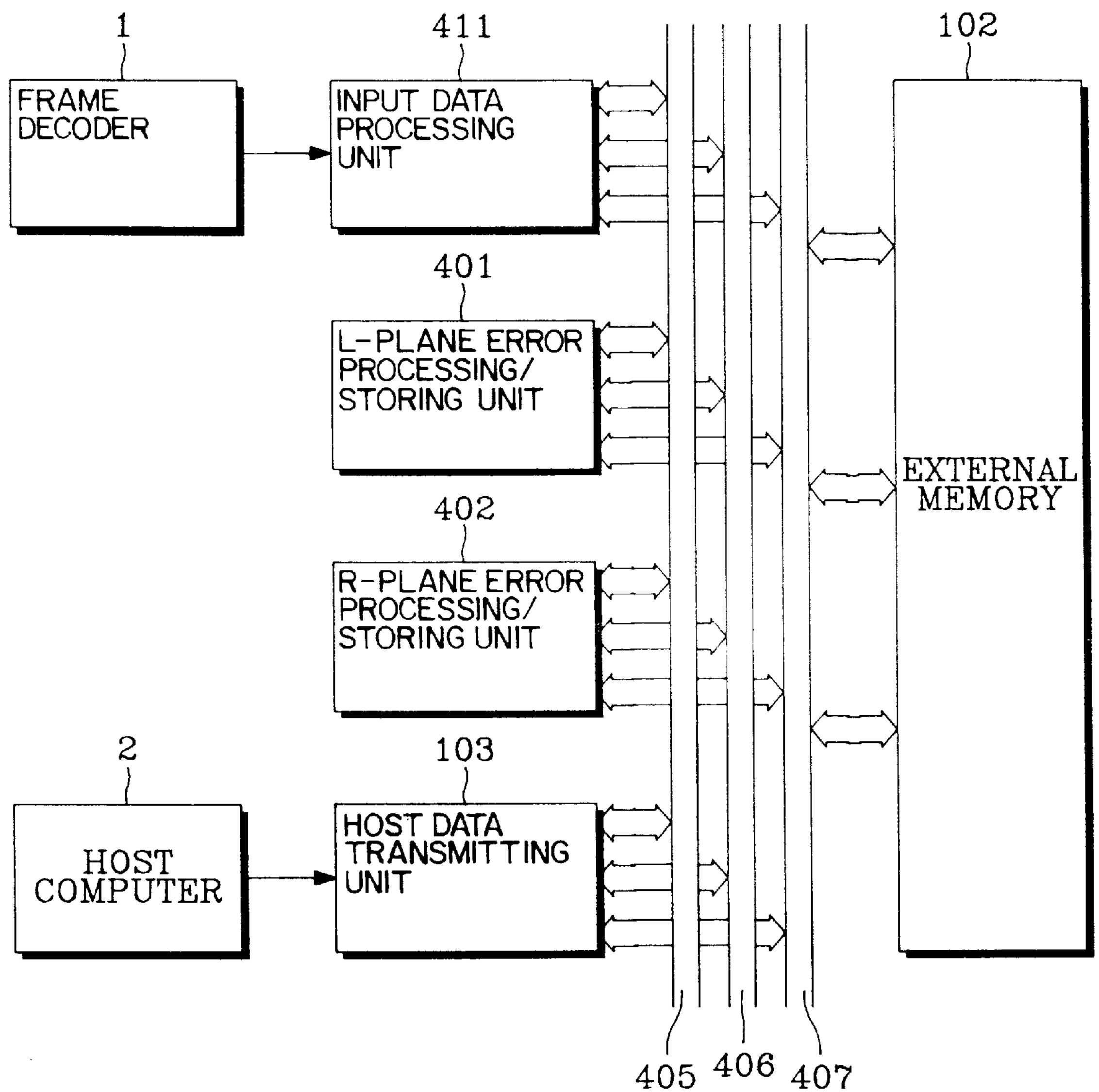
FIG. 5 is a circuit diagram according to one embodiment of the present invention.

Referring to FIG. 5, the sector data decoding circuit includes an input data processing unit 411 for rearranging data received from a frame decoder 1, into a CD-ROM sector data format, and storing the arranged data into an external memory 102. Also, an L-plane error processing/storing unit 401 performs error correction on data in the left plane of the sector data, and an R-plane error processing/storing unit 402 performs error correction on data in the right plane of the sector data. In addition to these units, a host data transmitting unit 103 transmits the data which is corrected and stored in external memory 102, to a host computer unit 2.

Figure 1:
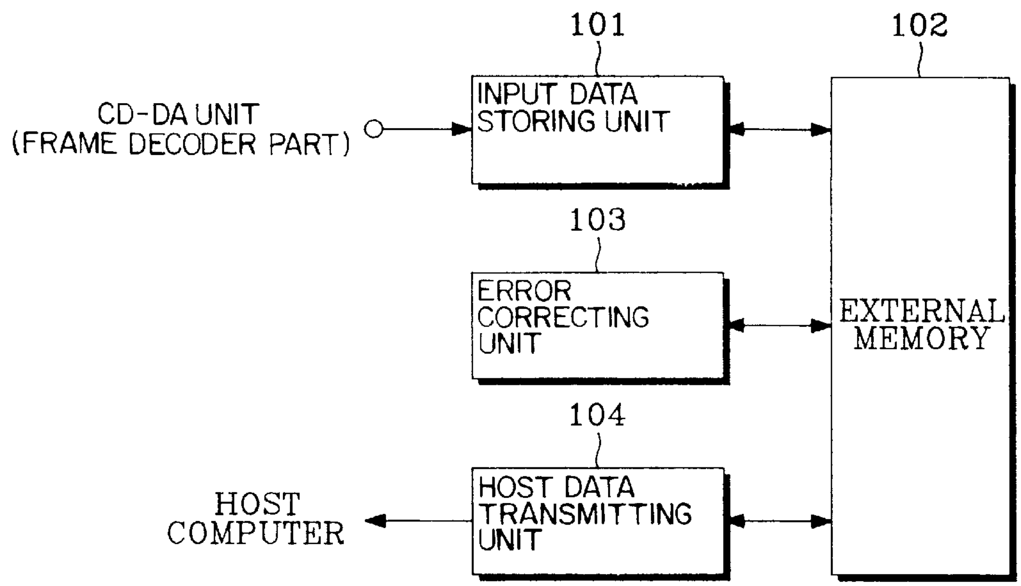
FIG. 1 shows a conventional system diagram.
Figure 2:
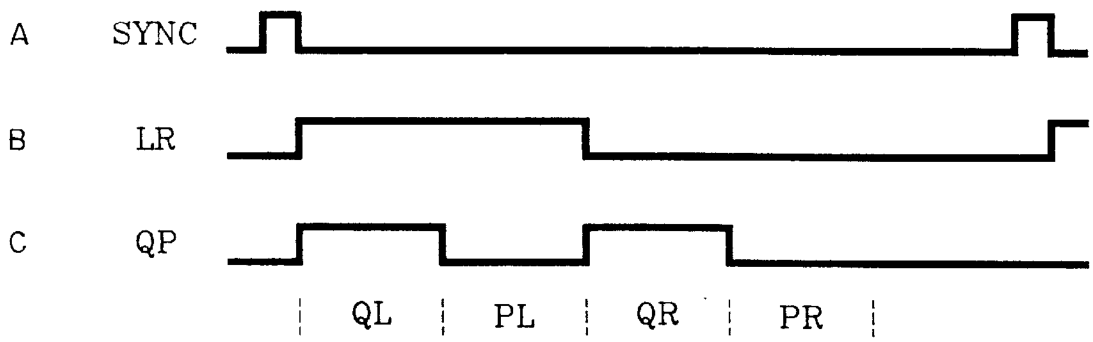
FIG. 2 shows timing charts containing waveforms for examples of conventional error correction processing.
Figure 3:
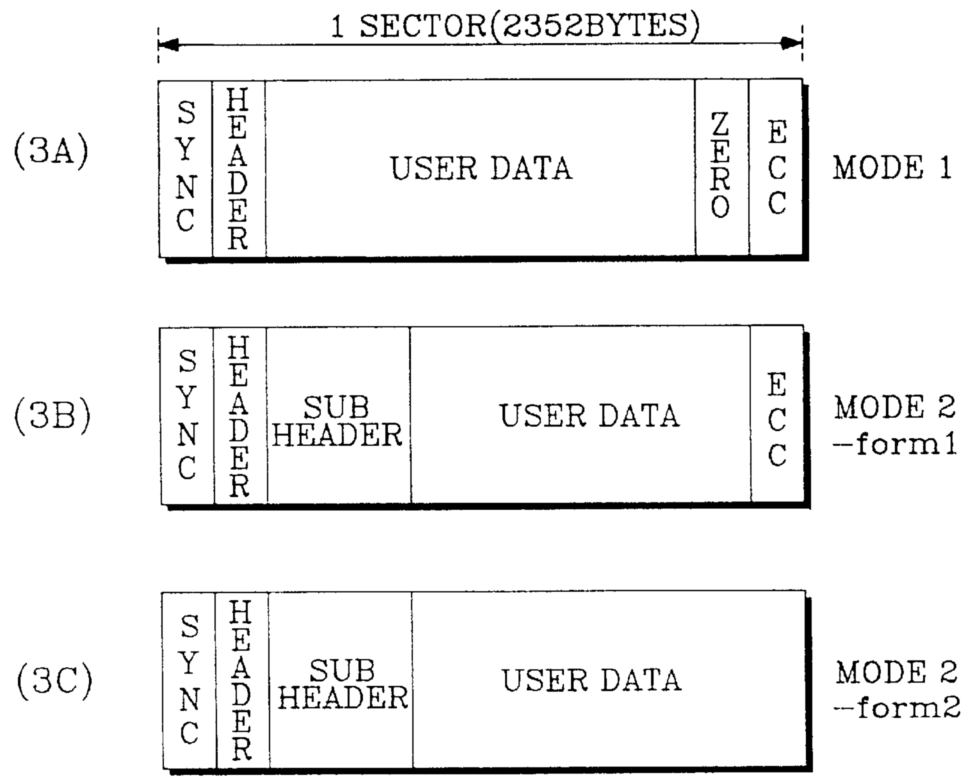
FIGS. 3(A)–3(C) show formats of general sector data.
Figure 6:
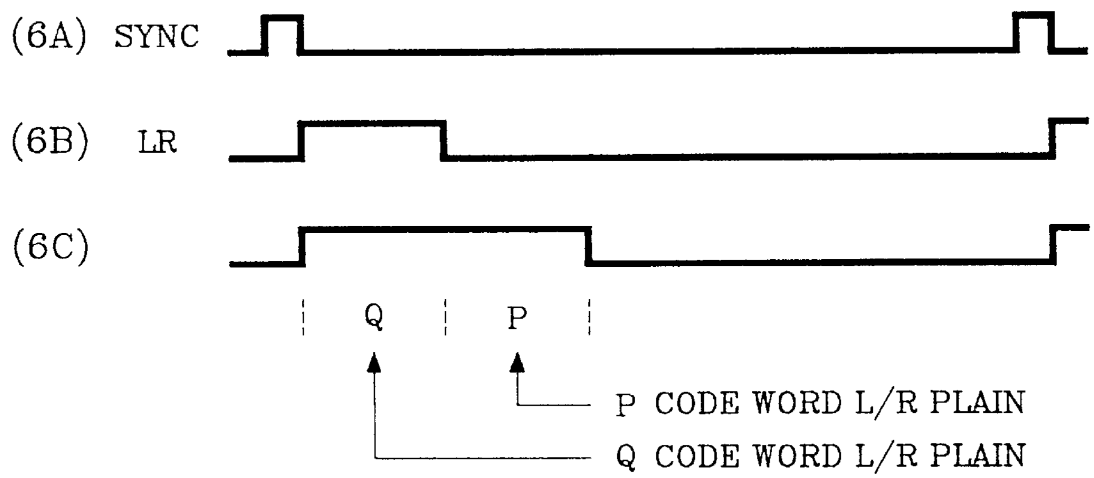
FIG. 6 shows timing charts according to the present invention.

FIG. 6 shows timing charts for illustrating the preferred embodiment of the present invention, in which waveform A shows a sync signal SYNC waveform, waveform B shows an L/R-plane selecting waveform of Q and P code words, and waveform C shows a waveform for setting an error correcting interval.

Now, the preferred embodiment of the present invention is described in detail below with reference to FIGS. 5 and 6.

Sync signal SYNC within the sector data, as shown by waveform A of FIG. 6, is detected by input data processing unit 411 from data output from frame decoder 1 to be supplied to L and R-plane error processing/storing units 401 and 402. At the same time, sync signal SYNC is supplied to external memory 102 which stores one sector data. The quantity of data received during one sync signal interval is 2352 bytes, as shown by waveform A of FIG. 6. Also, input data processing unit 101 generates an error correcting control signal as shown by waveform C in FIG. 6, and supplies that error correcting control signal to respective L/R-plane error processing/storing units 401 and 402, thereby setting an error correcting period. At this time, L/R-plane error processing/storing units 401 and 402 perform the error correcting process with respect to the input data such that input data processing unit 101 produces Q and P signals as shown by waveform B in FIG. 6. This allows L/R-plane error processing/storing parts 401 and 402 to read out one sector data stored in external memory 102 when the Q and P signals are in a high state, thereby executing the error correction on the L/R-planes of Q code words and storing the result in external memory 102. However, if the Q and P signals are in a low state, error correction is performed on the L/R-planes of P code words and the results stored in external memory 102. The P code may also be processed first under the high state.

Three separate data paths 405, 406 and 407, shown in FIG. 5, are provided between the input data processing unit 411, L-plane error processing storing unit 401, R-plane error processing storing unit 402, host data transmitting unit 103 and external memory 102. These separate data paths 405–407 provide for simultaneous data flow between the above respective units and allow the L-plane error processing storing unit 401 and R-plane error processing storing unit 402 to perform error correction at the same time.

Therefore, processing with respect to L/R-plane or Q/P code words is not performed separately, but the L and R-planes are processed at the same time in accordance with the Q and P code words. Thus, the time required for performing error correction is reduced by half while the time is decreased for corresponding to the host computer via high-speed data transmission as demanded by the host computer.

As described above, the time required for performing error correction during the period of receiving 2352 bytes data is reduced to afford much more time to transmit the data to the host computer. Accordingly, the present invention is effective in actively dealing with the high speed transmission required by the host computer.

It should be understood that the present invention is not limited to the particular embodiment disclosed herein as the best mode contemplated for carrying out the present invention, but rather the scope of the present invention is defined in the claims appended hereto.

What is claimed is:

1. A sector data decoding method of a CD-ROM drive, comprising:

performing an error correcting process on left (L) plane code-words of a sector data with an L-plane error correcting unit; and performing an error correcting process on right (R) plane code-words of the sector data with an R-plane error correcting unit, wherein the R-plane error correcting unit and the L-plane correcting unit perform the error correcting processes separately from each other and at the same time as each other.

2. The sector data decoding circuit recited in claim 1, wherein the code-word control signal indicates one of Q and P code-words.

3. The sector data decoding circuit recited in claim 1, wherein the L-plane and R-plane error correcting units are connected in parallel.

4. A sector data decoding circuit of a CD-ROM drive including an external memory, comprising:

an input data processing unit for rearranging data received from a frame decoder unit of the CD-ROM drive into a CD-ROM sector data format having code-words arranged in left (L) and right (R) planes, storing the rearranged data in the external memory, and generating a code-word control signal and an error correcting interval signal;

an L-plane error correcting unit for performing error correction on the L-plane code-words within the one sector data stored in the external memory, and storing the L-plane error corrected data in the external memory;

an R-plane error correcting unit for performing the error correction on the R-plane code-words within the one sector data stored in the external memory and storing the R-plane error corrected data in the external memory, wherein the L-plane and R-plane error correcting units perform the error correction at the same time; and a host data transmitting unit for transmitting to a host computer the data stored in the external memory after being error corrected by said L-plane and R-plane error correcting units.

5. A sector data decoding method of a CD-ROM drive, comprising:

rearranging data into a sector data format having left (L) and right (R) planes;

error correcting the L-plane data with an L-plane error correcting unit; and error correcting the R-plane data with an R-plane error correcting unit at the same time said L-plane correcting unit error corrects the L-plane data.

6. A sector data decoding method of a CD-ROM drive, comprising:

detecting a synchronization (sync) signal corresponding to receiving a sync field of a sector data, wherein said sector data is comprised of first and second code words arranged in first and second planes;

storing said sector data in a memory in response to detecting said sync signal;

reading the first-code-words of the first-plane from the memory and error correcting the first-plane first-code-words; and reading the first-code-words of the second-plane from the memory and error correcting the second-plane first-code-words at the same time the first-plane first-code-words are error corrected.

7. The sector data decoding method of a CD-ROM drive as recited in claim 6, further comprising:

reading the second-code-words of the first-plane from the memory and error correcting the first-plane second-code-words; and reading the second-code-words of the second-plane from the memory and error correcting the second-plane second-code-words at the same time the first-plane second-code-words are error corrected.

8. The sector data decoding method of a CD-ROM drive as recited in claim 7, wherein the first-code-words are CD-ROM data sector Q code words and the second-code-words are CD-ROM data sector P code words.

9. The sector data decoding method of a CD-ROM drive as recited in claim 8, wherein the first-plane is a left (L) plane and the second-plane is a right (R) plane.

10. The sector data decoding method of a CD-ROM drive as recited in claim 7, wherein the first-plane is a left (L) plane and the second-plane is a right (R) plane.

11. The sector data decoding method of a CD-ROM drive as recited in claim 7, wherein an input data processing unit produces a code-word control signal for indicating one of the first and second code-words and an error correcting control signal which when active indicates a time for performing an error correction operation, wherein the error correcting of the first-plane and second-plane first-code-words is performed in response to the code word control signal indicating the first-code-word and the error correcting control signal being active.

12. The sector data decoding method of a CD-ROM drive as recited in claim 11, wherein the error correcting of the first-plane and second-plane second-code-words is performed in response to the code word control signal indicating the second-code-word and the error correcting control signal being active.

13. The sector data decoding method of a CD-ROM drive as recited in claim 12, wherein the first-code-words are CD-ROM data sector Q code words and the second-code-words are CD-ROM data sector P code words.

14. The sector data decoding method of a CD-ROM drive as recited in claim 13, wherein the first-plane is a left (L) plane and the second-plane is a right (R) plane.

15. The sector data decoding method of a CD-ROM drive as recited in claim 12, wherein the first-plane is a left (L) plane and the second-plane is a right (R) plane.

16. The sector data decoding method of a CD-ROM drive as recited in claim 7, further comprising a host computer data transmitting unit for transmitting to a host computer the error corrected first and second-plane code words.

* * * * *